United States Patent [19]

Figliuzzi

[11] Patent Number: 5,179,921
[45] Date of Patent: Jan. 19, 1993

[54] INTEGRATED ENGINE AND COMPRESSOR DEVICE

[76] Inventor: Vincent Figliuzzi, W8724 White Crow Rd., Fort Atkinson, Wis. 53538

[21] Appl. No.: 828,017

[22] Filed: Jan. 30, 1992

[51] Int. Cl.⁵ .............................................. F02B 77/00
[52] U.S. Cl. .............................. 123/198 C; 123/41.47; 123/179.31; 123/559.1; 417/364; 418/191
[58] Field of Search .............. 123/41.47, 179.31, 198 C, 123/559.1, 41.44, 54 R; 417/364, 380; 418/191

[56] References Cited

U.S. PATENT DOCUMENTS

| | | | |
|---|---|---|---|
| 844,836 | 2/1907 | Treen | 123/54 R |
| 1,246,919 | 11/1917 | Herring | 117/364 |
| 1,527,003 | 2/1925 | Morton | 123/2 |
| 2,258,159 | 10/1941 | Nardone | 123/179.31 |
| 2,258,160 | 10/1941 | Nardone | 60/18 |
| 2,500,366 | 3/1950 | Lamberton | 230/206 |
| 3,094,845 | 6/1963 | Mallofre | 60/60 |
| 4,553,512 | 11/1985 | Showman | 123/196 S |
| 4,614,169 | 9/1986 | Figliuzzi | 123/54 R |
| 4,779,905 | 10/1988 | Ito et al. | 290/1 B |
| 4,827,881 | 5/1989 | Baker et al. | 123/196 R |
| 4,846,122 | 7/1989 | Kristof et al. | 123/179.31 |
| 4,879,981 | 11/1989 | Matsumoto | 123/198 C |

*Primary Examiner*—Noah P. Kamen
*Attorney, Agent, or Firm*—Hill, Steadman & Simpson

[57] ABSTRACT

A combination reciprocating piston device, such as an internal combustion engine, and a rotary machine of the intermeshing gear type, such as a hydraulic pump, are afforded in a compact arrangement that eliminates the need for separate crankshafts or separate rotary machine rotors. This reciprocating piston machine operates with a pair of oppositely rotatable crankshafts which are drivingly connected to the piston such that the piston reciprocates in its cylinder in a true straight-line motion. The crankshafts are respectively provided with a pair of balance gears which directly intermesh with one another to coincide the rotational movement of the crankshafts. The balance gears also serve as the rotors for a rotary fluid machine in which the lobes of the rotors provide positive fluid displacement.

10 Claims, 2 Drawing Sheets

5,179,921

1

INTEGRATED ENGINE AND COMPRESSOR DEVICE

BACKGROUND OF THE INVENTION

The invention relates to a reciprocating piston machine integrated with a rotary machine of intermeshing gear configuration. More particularly, the invention concerns a reciprocating piston internal combustion engine having dual crankshafts balanced by intermeshing rotary gears, which are also utilized for positive fluid displacement.

The inventor described a reciprocating piston machine in Figliuzzi U.S. Pat. No. 4,614,169, in which the piston moves in true straightline fashion along the longitudinal axis of the cylinder to provide higher piston power efficiency and effectiveness. This piston machine utilizes a pair of oppositely rotatable crankshafts disposed on opposite sides of the longitudinal axis of the cylinder, each crankshaft having an eccentric arm intersecting with the longitudinal plane of the cylinder. A translator element is disposed within the longitudinal plane of the piston cylinder, and connected to the piston. A pair of cams are respectively connected between each eccentric arm and the translator element and relatively movable of the translator element for imparting back and forth straightline motion to the translator element and thus the piston in the cylinder. A pair of oppositely rotating balance gears are respectively connected to the crankshafts and directly intermesh with one another to coincide the rotational movement of the crankshafts with one another.

In the preferred embodiment described in U.S. Pat. No. 4,614,169, the piston machine is an internal combustion engine. The internal combustion engine can be made to run as an Otto cycle, diesel cycle, or dual cycle, as known in the combustion engine art.

It is an object of the present invention to associate the internal combustion engine of U.S. Pat. No. 4,614,169 with a hydraulic pump, hydraulic motor, or air compressor or blower which, for example, performs secondary function fluid delivery roles in the operation of the overall engine machinery, and to provide this association in a compact, integrated design. It is also an object of the present invention to provide a versatile design associating a rotary fluid machine with the internal combustion engine of U.S. Pat. No. 4,614,169, such that, for example, the rotary fluid machine can be applied for use as an engine starter, a lubrication pump, or both, a blower or supercharger for the combustion cycle, or a source of pressurized working fluid for external uses, all in a compact arrangement. By virtue of the present invention, a rotary fluid motor or pump is associated with a reciprocating piston machine without requiring any additional gearing or drive transmission devices beyond the crankshaft mechanisms already being utilized for the operation of the reciprocating piston machine.

SUMMARY OF THE INVENTION

A rotary fluid machine formed by a pair of wheels of intermeshing gear configuration functions in association with a reciprocating piston device in which the piston movement is directed in true straightline fashion by a pair of oppositely rotatable crankshafts. A pair of oppositely rotatable crankshafts are operatively connected to a pair of balance gears which directly intermesh with one another to coincide the rotational movement of the crankshafts with one another. The balance gears are supported for rotation within a housing defining a fluid working chamber, such that the balance gears simultaneously serve as a positive displacement rotary fluid machine. The balance gear's housing is provided with appropriate fluid inlet and fluid outlet connections.

In accordance with the preferred embodiment, the reciprocating piston device is an internal combustion engine. The rotary fluid machine formed by the intermeshing balance gears may constitute the pumping element for hydraulic fluid used during normal running of the associated internal combustion engine. Alternatively or additionally, a hydraulic pressure storage unit or source may be provided in connection with the rotary fluid machine such that the rotary machine may act as a prime mover for converting the fluid energy received from the hydraulic pressure source into mechanical work for imparting initial rotary movement to the engine crankshafts to serve as a hydraulic engine starter. It is also contemplated that the balance gears can be used as an air compressor, or connected to rotors of a rootstype blower for scavenging or supercharging the cylinder of the internal combustion engine.

DESCRIPTION OF THE PREFERRED EMBODIMENTS

Figure 1:
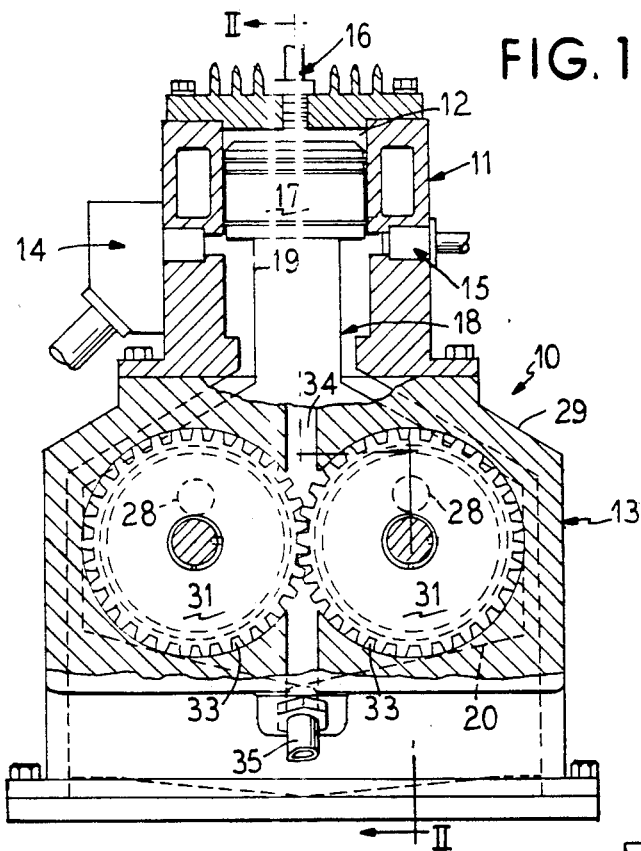
FIG. 1 is a cross-sectional, side elevational view of an internal combustion piston engine constructed in accordance with a preferred embodiment of the invention.
Figure 2:
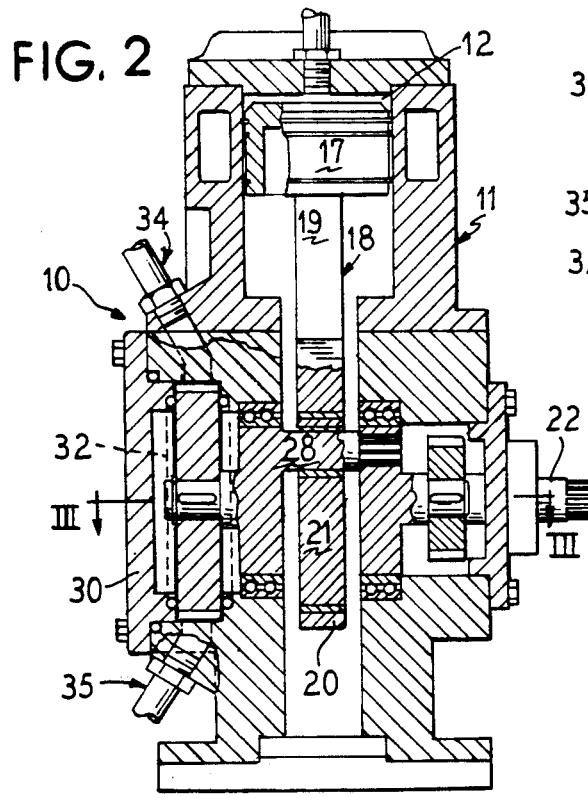
FIG. 2 is a cross-sectional view taken along the lines II—II of FIG. 1.
Figure 3:
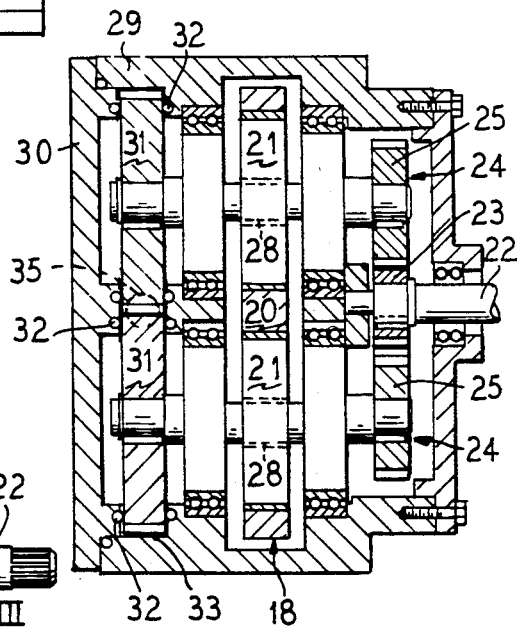
FIG. 3 is a cross-sectional view taken along the lines III—III of FIG. 2.

FIGS. 1-3 illustrate a preferred embodiment of the present invention in which there is provided an internal combustion engine 10 of the reciprocating piston type of a design as previously described in Figliuzzi U.S. Pat. No. 4,614,169. The internal combustion engine is provided with a vertically directed cylinder casing 11 defining a cylinder chamber space 12. The cylinder 11 is disposed on a crank case 13 defining an open interior volume which communicates with the cylinder chamber 12. The engine 10 may be of a diesel type, such that the cylinder is provided with a pressurized air port system 14 and an exhaust gas discharge system 15. A suitable diesel fuel inlet system 16 extends through the top surface of the cylinder 11. It is also within the contemplation of the present invention that the internal combustion piston engine operates on other combustion engine cycles and is provided with charging, firing, and exhaust mechanisms of known type and suitable for such other engine cycle operations.

A piston 17 is disposed for reciprocation within the cylinder chamber 12. The piston 17 is moved back and forth within the cylinder chamber 12 in true straightline motion, by virtue of being connected to a translator element 18 disposed in a longitudinal plane defined by the cylinder chamber 12 and providing a driving force directly at the piston along the longitudinal axis of the cylinder chamber 12. The translator element 18 is formed with a neck portion 19 connected to the piston, and a relatively enlarged base portion 20 which is disposed within the interior volume of the crankcase 13. The back and forth straightline movement of the translator element 18 is effected by a pair of essentially eccentrically rotated members drivingly connected to the translator element 18 and disposed on opposed sides of the longitudinal axis of the cylinder chamber 12. These eccentrically rotating members may be in the form of cams 21 (as shown) journaled in the translator element, connecting rods, or other suitable mechanisms.

For bringing about the eccentric rotation of the mechanisms 21, the internal combustion engine 10 operates with a pair of oppositely rotatable crankshafts 24, each respectively coinciding with a corresponding one of the rotating mechanisms 21. This drive transmission arrangement for the internal combustion engine is as described in the '169 patent. As shown in FIGS. 2 and 3, a rotatable drive shaft 22 is supported within the crank case 13 and formed with a drive gear 23 disposed coaxially between pair of parallel extending crankshafts 24. A rotatable pick-up gear 25 keyed for rotation on each crankshaft is drivingly engaged with the drive shaft gear 23 on opposed sides thereof. Each crankshaft is then formed with an eccentric arm 28 extending through the translator element 18 for eccentric connection with the rotatable mechanism 21. Thereafter, each crankshaft terminates in supporting for rotation a gear wheel 31. The gear wheels 31 of the crankshafts directly intermesh with one another, serving as balance gears, to coincide the rotational movement of the crankshafts 24 with one another. Thus, the crankshafts 24 rotate with the same relative movement, but in opposite directions of one another.

It will be noted from FIG. 3 that the intermeshing gear wheels 31 have teeth and that these toothed outer annular surfaces are sealably contained in crank case housing portions 29 and 30 by seal rings 32. Between the toothed surfaces of the gear wheels 31 and the housing surfaces they face are defined spaces 33 through which fluid is conveyed, separate from the crank case volume. The housing 29 is provided with suitable fluid inlet 34 and fluid outlet 35 connections to permit the flow of a fluid into and out of the fluid spaces 33 at the center of the chamber on either side of a contact area between the two gears 31. Thus, in accordance with the invention, the intermeshing gear wheels serve not only to balance and coincide rotation of the dual crankshafts 24 serving as the drive transmission for the internal combustion engine 10, but also as a rotary fluid machine of the expansible-chamber type. Such rotary fluid machines using intermeshing rotors in the style of intermeshing gears are generally known in the art, the lobe or tooth design and placement on the gear wheels being a matter of engineering design.

Figure 4:
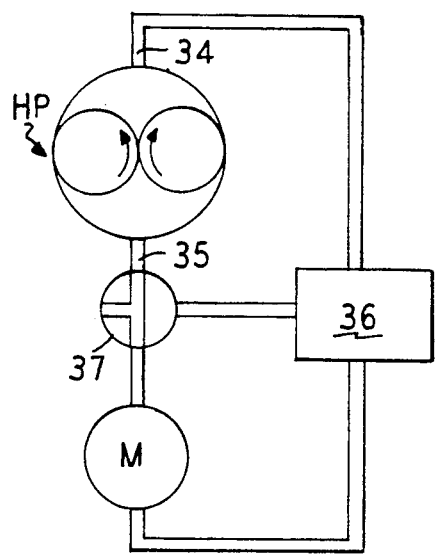
FIG. 4 is a diagrammatic view of the invention incorporating a rotary, expansible-chamber hydraulic pump.

FIG. 4 illustrates one exemplary use of the rotary fluid machine as a hydraulic pump HP, such as might be used to pump hydraulic liquid from a reservoir 36 to serve the needs of a hydraulic system associated with the internal combustion engine or might be utilized to pump liquid from the reservoir 36, as shown, to deliver the liquid under pressure as the driving fluid for a hydraulic motor M (as needed, and which may or may not be associated with the internal combustion engine system) via a control valve 37. The fluid inlet connection 34 is disposed on that side of the rotary machine housing 32 such that the fluid is conducted by the lobes of the contra-rotating gear wheels 31 about each gear cavity in the housing until the fluid in the space between the lobes of the gears is exposed to the fluid outlet 35 on the other side of the housing. Pumping energy is imparted from the gear wheels being turned by the action of the internal combustion engine through the crankshafts to the fluid being conducted through the spaces 33 of the rotary machine housing. Downstream of the hydraulic pump HP, the hydraulic motor M utilizes the energy of the pumped liquid to do work. The liquid spent from the hydraulic motor 37 is then conducted to the reservoir 36, which serves as the supply of hydraulic liquid for the hydraulic pump HP.

Figure 5:
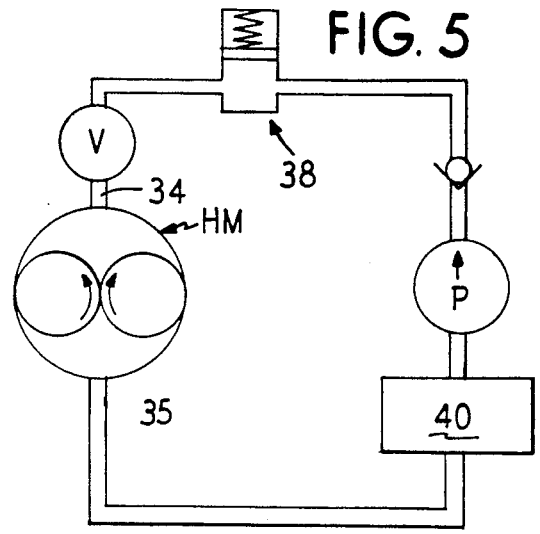
FIG. 5 is a diagrammatic view of the invention incorporating a rotary, expansible-chamber hydraulic starter motor.

Another possible use of the rotary machine is to serve as a hydraulic motor HM, such as for initially starting the internal combustion engine, as shown in FIG. 5. Pressurized fluid would be passed to the fluid inlet 34 for the rotary machine via a control valve V. The fluid under pressure acts against the lobes of the gear wheels 31 for movement about their respective cavities in the housing until the liquid in the spaces between the lobes is exposed to the fluid outlet 35 from which the liquid discharges from the housing 32. This rotary movement of the gear wheels 31 is imparted to the crankshafts 24, causing reciprocation of the translator element 18 and thus the engine piston 17 to perform a starting cycle on the engine. The source of hydraulic pressure for the hydraulic motor HM is a pressure accumulator 38 which is in communication with the fluid inlet connection 34. A suitable manually operated pump P connected to a supply source 40 of unpressurized hydraulic fluid, can be used to charge the accumulator with pressurized liquid. Upon start-up of the engine with the hydro-starter, the hydraulic motor HM would be disconnected from communication with the accumulator 38, by suitable closing of the control valve V. When the control valve has placed the fluid inlet 34 out of communication with the accumulator 38, the gear wheels 31 may thereafter be free-wheeling or, alternatively, the control valve could place the fluid inlet 34 in communication with a reservoir supply of unpressurized hydraulic fluid such that the gear wheels could thereafter function as a hydraulic pump in the manner described in connection with FIG. 4.

Figure 6:
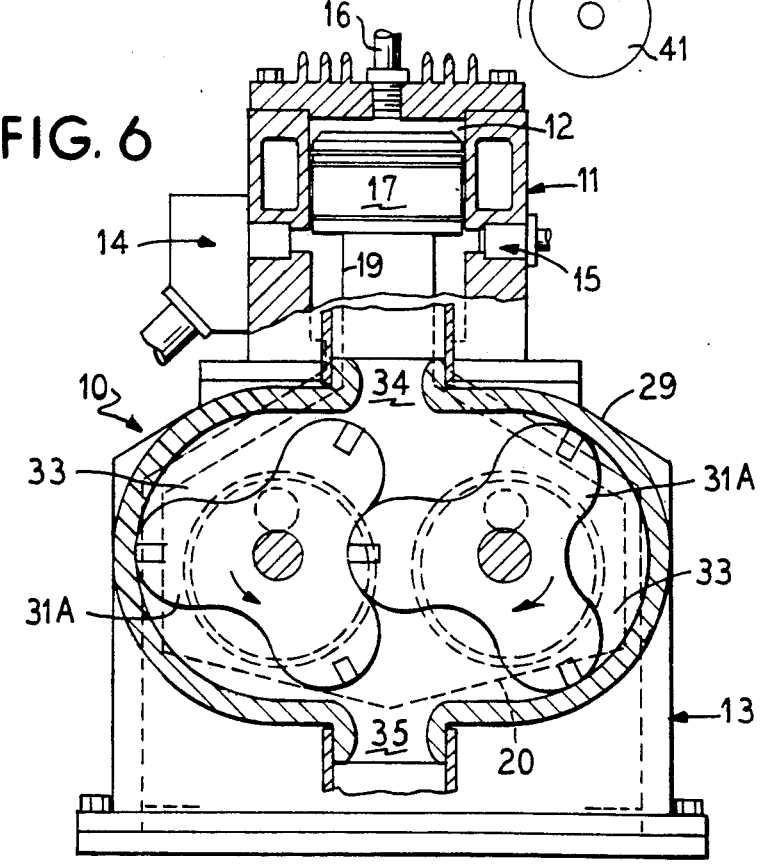
FIG. 6 is a cross-sectional, side elevational view of the internal combustion engine of FIG. 1 constructed in accordance with another embodiment of the invention.

The rotary fluid machine is not limited to handling hydraulic fluids, but may also work with gas. Another possible use of the rotary machine is to serve as an air blower, e.g. of the Roots type, possibly for use in scavenging or supercharging the piston cylinder 12 of the internal combustion engine. FIG. 6 depicts such an arrangement in this embodiment of the invention. The features described above in connection with FIGS. 1-3 are again repeated and hence like reference numerals are used. However, rather than the gear wheels shown as 31 in FIGS. 1-3, the invention also contemplates using lobed rotors as the intermeshing gear wheels for the rotary fluid machine, such as for an air blower application. In FIG. 6, the lobed rotor-type gear wheels are labeled 31A, and, as discussed above, again serve to coincide the rotational movement of the dual crankshafts 24 with one another and provide a rotary fluid machine of the expansible-chamber type.

Figure 7:
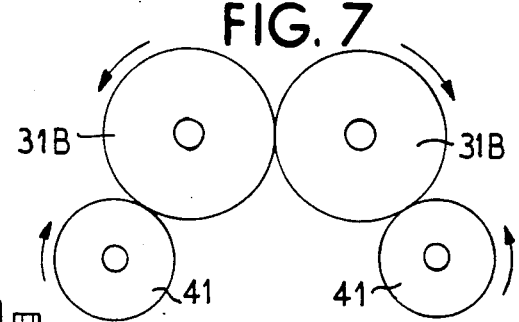
FIG. 7 is a diagrammatic view of a speed reduction gearing arrangement which could be utilized in accordance with the invention.

It should also be noted that the intermeshing balance gear wheels need not be directly driven from the crankshafts 24. Thus, if the engine crankshaft rotation rate is too small or too great (which is more likely) for suitable or design operation of the rotary fluid machine formed by the intermeshing balance gear wheels, intermediate gearing can be disposed between the crankshaft and the balance gear wheels to adjust the rotational speed of the gears for use in the rotary machine. For example, as shown in FIG. 7, a spur gear 41 can be fitted for rotation on the ends of the crankshafts 24 to rotatably engage balance gears 31B, respectively. The balance gears 31B could then be keyed for rotation on shafts for turning the rotors of a separately housed rotary fluid machine of the intermeshing gear type. If, as shown in FIG. 7, the ratio of diameters between the balance gear and its associated crankshaft spur gear is 2:1, then the balance gears 31B would be rotating at one-half the speed of revolution of the spur gears. Of course, in this event of using intermediate timing gears between the crankshafts 24 and the balance gears 31B, the intermeshed rotary connection between the balance gears 31B would necessarily continue to serve to coincide the rotational movement of the crankshafts 24 with one another.

A gearing down arrangement, such as shown in FIG. 7 or otherwise, is especially contemplated should the balance gears 31B be utilized to operate an air compressor or a Roots blower which would be of the intermeshing lobe or gear-type design.

As discussed in the '169 patent, the internal combustion engine 10 may operate with a pair of opposed pistons connected to the translator element 18, rather than a single piston as shown here. Additionally, the dual crankshafts 24 may be used to operate a series of translator elements connected to a piston or pistons. Other engineering modifications to that which has been described herein may occur to those versed in the art without departing from the spirit of the instant invention. It should be understood that I wish to embody within the scope of the patent warranted hereon all such modifications as reasonably and properly come within the scope of my contribution to the art. The inventive concept should not be limited except as described in the appended claims, which include all similar structure operating in substantially the same manner to obtain substantially the same results.

What is claimed is:

1. A combination piston engine and rotary machine comprising: a piston reciprocally movable in a cylinder having fluid inlet and outlet connections thereto, a pair of oppositely rotatable crankshaft means disposed on opposed sides of the longitudinal axis of said cylinder within a crank case, each crankshaft means having an element intersecting with a longitudinal plane of said cylinder, a one-piece translator connected to said piston, engaged by said elements and disposed in said longitudinal plane extending from said cylinder into said crank case for moving in a true straight line motion along said longitudinal axis, and a rotary unit comprising a pair of intermeshing gear wheels disposed in an enclosed casing separate of said crank case and connected to said elements for coinciding the rotation of said pair of crankshaft means, said casing having fluid inlet and outlet connections thereto, whereby said rotary unit functions to coincide the rotation of said engine crankshaft means and operate as an expansible-chamber, fluid machine.

2. The combination piston engine and rotary machine of claim 1, wherein said rotary unit defines a hydraulic pump.

3. The combination piston engine and rotary machine of claim 2, further comprising a hydraulic motor, means for connecting said fluid outlet of said rotary unit to the intake of said hydraulic motor.

4. The combination piston engine and rotary machine of claim 1, wherein said rotary unit defines a gas compressor.

5. The combination piston engine and rotary machine of claim 4, wherein said cylinder defines an internal combustion engine.

6. The combination piston engine and rotary machine of claim 1, wherein said rotary unit defines a hydraulic motor, with means for connecting said fluid inlet to a source of pressurized hydraulic fluid.

7. A rotary fluid machine comprising a pair of wheels of intermeshing gear configuration, said wheels disposed in a housing having fluid inlet and outlet connections thereto, said wheels connected respectively to a pair of oppositely rotatable crankshafts operatively connected to a piston reciprocally movable in a cylinder, wherein said crankshafts are contained in a crankcase and said wheels are contained in a chamber defined by said housing separate of said crankcase.

8. The rotary fluid machine of claim 7, wherein said wheels are mounted for rotation on said crankshafts.

9. The rotary fluid machine of claim 7 or 8, wherein said cylinder has air and fuel intake means and exhaust gas discharge means, such that said piston and said cylinder serve as an internal combustion engine.

10. The rotary fluid machine of claim 7 or 8, wherein said machine is adapted to utilize hydraulic fluid.

* * * * *